United States Patent
Kim et al.

(10) Patent No.: US 9,259,799 B2
(45) Date of Patent: Feb. 16, 2016

(54) WELDING HORN FOR SECONDARY BATTERY

(71) Applicant: Samsung SDI Co., Ltd., Yongin-si, Gyeonggi-do (KR)

(72) Inventors: Hyun-Jun Kim, Yongin-si (KR); Dong-Bin Min, Yongin-si (KR); Chea-Hyun Lim, Yongin-si (KR)

(73) Assignee: SAMSUNG SDI CO. LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/226,376

(22) Filed: Mar. 26, 2014

(65) Prior Publication Data

US 2014/0299652 A1    Oct. 9, 2014

(30) Foreign Application Priority Data

Apr. 4, 2013    (KR) .................. 10-2013-0037048

(51) Int. Cl.
| | |
|---|---|
| *B23K 1/06* | (2006.01) |
| *B23K 20/10* | (2006.01) |
| *H01M 2/26* | (2006.01) |
| *H01M 10/052* | (2010.01) |
| *H01M 10/058* | (2010.01) |

(52) U.S. Cl.
CPC ............ *B23K 20/106* (2013.01); *B23K 1/06* (2013.01); *H01M 2/26* (2013.01); *B23K 2201/38* (2013.01); *H01M 10/052* (2013.01); *H01M 10/058* (2013.01)

(58) Field of Classification Search
None
See application file for complete search history.

(56) References Cited

U.S. PATENT DOCUMENTS

| | | | | |
|---|---|---|---|---|
| 3,752,380 | A | * | 8/1973 | Shoh ............................... 228/1.1 |
| 5,096,532 | A | * | 3/1992 | Neuwirth et al. ........... 156/580.1 |
| 5,603,444 | A | * | 2/1997 | Sato ................................ 228/1.1 |
| 5,884,831 | A | * | 3/1999 | Sato et al. ...................... 228/6.2 |
| 6,078,125 | A | * | 6/2000 | Roberts ......................... 310/325 |
| 6,109,502 | A | * | 8/2000 | Sato ................................ 228/1.1 |
| 6,168,063 | B1 | * | 1/2001 | Sato et al. ...................... 228/1.1 |
| 6,247,628 | B1 | * | 6/2001 | Sato et al. ...................... 228/1.1 |
| 6,935,548 | B2 | * | 8/2005 | Reiber et al. .................. 228/4.5 |
| 7,264,146 | B2 | * | 9/2007 | Takeuchi et al. ............... 228/1.1 |
| 7,793,815 | B2 | * | 9/2010 | Shimizu et al. ................ 228/1.1 |
| 7,984,839 | B2 | * | 7/2011 | Buttiker ......................... 228/1.1 |
| 8,167,187 | B2 | * | 5/2012 | Bayerer et al. ............. 228/110.1 |
| 8,201,722 | B2 | * | 6/2012 | Sato et al. ...................... 228/1.1 |

(Continued)

FOREIGN PATENT DOCUMENTS

| | | | |
|---|---|---|---|
| EP | WO 89/01384 | * | 2/1989 |
| EP | 0894562 A1 | * | 2/1999 |

(Continued)

OTHER PUBLICATIONS

Seo, J S et al. "Ultrasonic Deposit Junction Characteristic Evaluation of Metal Sheets Al/Al and Al/Cu" *Kor. J. Met. Mater.*, 49(8):642-648.

*Primary Examiner* — Kiley Stoner
(74) *Attorney, Agent, or Firm* — Knobbe Martens Olson & Bear LLP

(57) ABSTRACT

A welding horn for a secondary battery, used in ultrasonic welding includes a body portion having coupling portions respectively provided at one and the other ends thereof; and a tip portion provided at a central portion of the body portion and having protruding portions provided on a surface thereof. In the welding horn, a nitride is coated on at least one surface of the welding horn.

14 Claims, 4 Drawing Sheets

(56) References Cited

U.S. PATENT DOCUMENTS

| | | | |
|---|---|---|---|
| 8,657,182 B2* | 2/2014 | Buettiker | 228/110.1 |
| 2003/0006265 A1* | 1/2003 | Sato | 228/1.1 |
| 2003/0038158 A1* | 2/2003 | Takahashi et al. | 228/110.1 |
| 2003/0136523 A1* | 7/2003 | Takahashi et al. | 156/580.1 |
| 2003/0160084 A1* | 8/2003 | Higashiyama | 228/1.1 |
| 2003/0168938 A1* | 9/2003 | Wallaschek et al. | 310/328 |
| 2004/0065415 A1* | 4/2004 | Sato et al. | 156/580.1 |
| 2004/0211812 A1* | 10/2004 | Hizukuri et al. | 228/1.1 |
| 2005/0199676 A1* | 9/2005 | Stroh et al. | 228/1.1 |
| 2005/0205641 A1* | 9/2005 | Takeuchi et al. | 228/1.1 |
| 2005/0210670 A1* | 9/2005 | Gourash et al. | 29/753 |
| 2005/0227429 A1* | 10/2005 | Minamitani et al. | 438/222 |
| 2006/0231592 A1* | 10/2006 | Takeuchi et al. | 228/101 |
| 2007/0068991 A1* | 3/2007 | Handel et al. | 228/1.1 |
| 2007/0187457 A1* | 8/2007 | Minamitani et al. | 228/1.1 |
| 2007/0199972 A1* | 8/2007 | Chong et al. | 228/1.1 |
| 2008/0197172 A1* | 8/2008 | Reiber | 228/180.5 |
| 2010/0320257 A1* | 12/2010 | Buttiker | 228/110.1 |
| 2011/0042014 A1* | 2/2011 | Vogler | 156/580.1 |
| 2011/0204126 A1* | 8/2011 | Von Campe et al. | 228/262 |
| 2011/0220292 A1* | 9/2011 | Short | 156/580.1 |
| 2012/0070720 A1* | 3/2012 | Aizawa et al. | 429/163 |
| 2013/0011717 A1* | 1/2013 | Yotsumoto | 429/153 |
| 2013/0019458 A1* | 1/2013 | Byars et al. | 29/559 |
| 2013/0075454 A1* | 3/2013 | Buettiker | 228/110.1 |

FOREIGN PATENT DOCUMENTS

| | | |
|---|---|---|
| JP | 2003-266180 A | 9/2003 |
| JP | 2011-206754 A | 10/2011 |
| KR | 10-0851416 B1 | 8/2008 |
| KR | 10-0891965 B1 | 3/2009 |
| KR | 10-0933791 B1 | 12/2009 |
| KR | 10-0933792 B1 | 12/2009 |
| KR | 10-0934241 B1 | 12/2009 |
| KR | 10-0939975 B1 | 1/2010 |
| KR | WO 2012/091473 A2 * | 7/2012 |
| WO | WO 9503685 A1 * | 2/1995 |

* cited by examiner (a)

(b)

(a)

(b)

WELDING HORN FOR SECONDARY BATTERY

CROSS-REFERENCE TO RELATED APPLICATIONS

This application claims priority to and the benefit of Korean Patent Application No. 10-2013-0037048, filed on Apr. 4, 2013, in the Korean Intellectual Property Office, the entire content of which is incorporated herein by reference.

BACKGROUND

1. Field

An aspect of the present embodiments relates to a welding horn for a secondary battery, and more particularly, to a welding horn for a secondary battery, which improves welding performance and increases lifespan.

2. Description of the Related Technology

In general, a secondary battery is a battery which can be charged/discharged numerous times, and demands on secondary batteries which can be easily employed as power sources of portable devices have recently been increased with the development of electrical, electronic and computer industries. Studies on secondary batteries have been conducted in various fields in order to improve performance and safety as the use pattern and quantity of the secondary batteries.

Such a secondary battery includes an electrode assembly having a positive electrode plate, a negative electrode plate and a separator interposed between these electrode plates, and an electrolyte helping the movement of ions. The secondary battery can be reversibly charged and discharged by an electrochemical reaction between the positive and negative electrode plates. The secondary battery is connected to a battery case by an electrode tab provided to each of the positive and negative electrode plates so as to be electrically connected to an external device. In this case, various studies on the electrode tab have been conducted to improved productivity while being firmly connected to each of the positive and negative electrodes.

SUMMARY

Embodiments provide a welding horn for a secondary battery, which can improve the productivity of the secondary battery.

Embodiments also provide a welding horn for a secondary battery, which can improve weldability and increase the lifespan of the secondary battery.

According to an aspect of the present embodiments, there is provided a welding horn for a secondary battery, used in ultrasonic welding, the welding horn including: a body portion having coupling portions respectively provided at one and the other ends thereof; and a tip portion provided at a central portion of the body portion and having protruding portions provided on a surface thereof, wherein a nitride is coated on at least one surface of the welding horn.

The nitride may be coated on the tip portion. The nitride may include TiN. The nitride may be coated to have a thickness of from about 2 to about 3 μm.

The welding horn may be used in welding an electrode tab to a surface of a positive or negative electrode plate.

The body portion may have a flat surface extended in a first direction, and the first direction may be a direction extended from the one end to the other end of the body portion.

The tip portion may be protruded on the flat surface, and may be extended in a second direction perpendicular to the first direction so as to traverse the flat surface.

The tip portion may be protruded on the flat surface by being extended in a rod shape to connect an upper end portion to a lower end portion of the flat surface.

The flat surface may be provided in a pair opposite to each other, and the tip portion may be provided in a pair to both the pair of flat surfaces. The tip portions may be provided at positions corresponding to each other.

The protruding portion may be provided to protrude from a first surface of the tip portion, and the first surface may be a surface parallel with the flat surface.

The protruding portion may be protruded in the shape of a triangular pyramid of which base side mounted on the first surface is quadrangular.

The coupling portion may be a portion coupled to an external device, and include cylindrical support portions respectively provided at the one and the other ends of the body portion, and a fastening projection protruded outward from the support portion and having a screw thread on a surface thereof.

As described above, according to the present embodiments, it is possible to provide a welding horn for a secondary battery, which can improve weldability and increase the lifespan of the secondary battery.

Further, it is possible to provide a welding horn for a secondary battery, which can improve weldability and increase the lifespan of the secondary battery.

BRIEF DESCRIPTION OF THE DRAWINGS

The accompanying drawings, together with the specification, illustrate example embodiments, and, together with the description, serve to explain the principles of the present embodiments.

DETAILED DESCRIPTION

Figure 1:
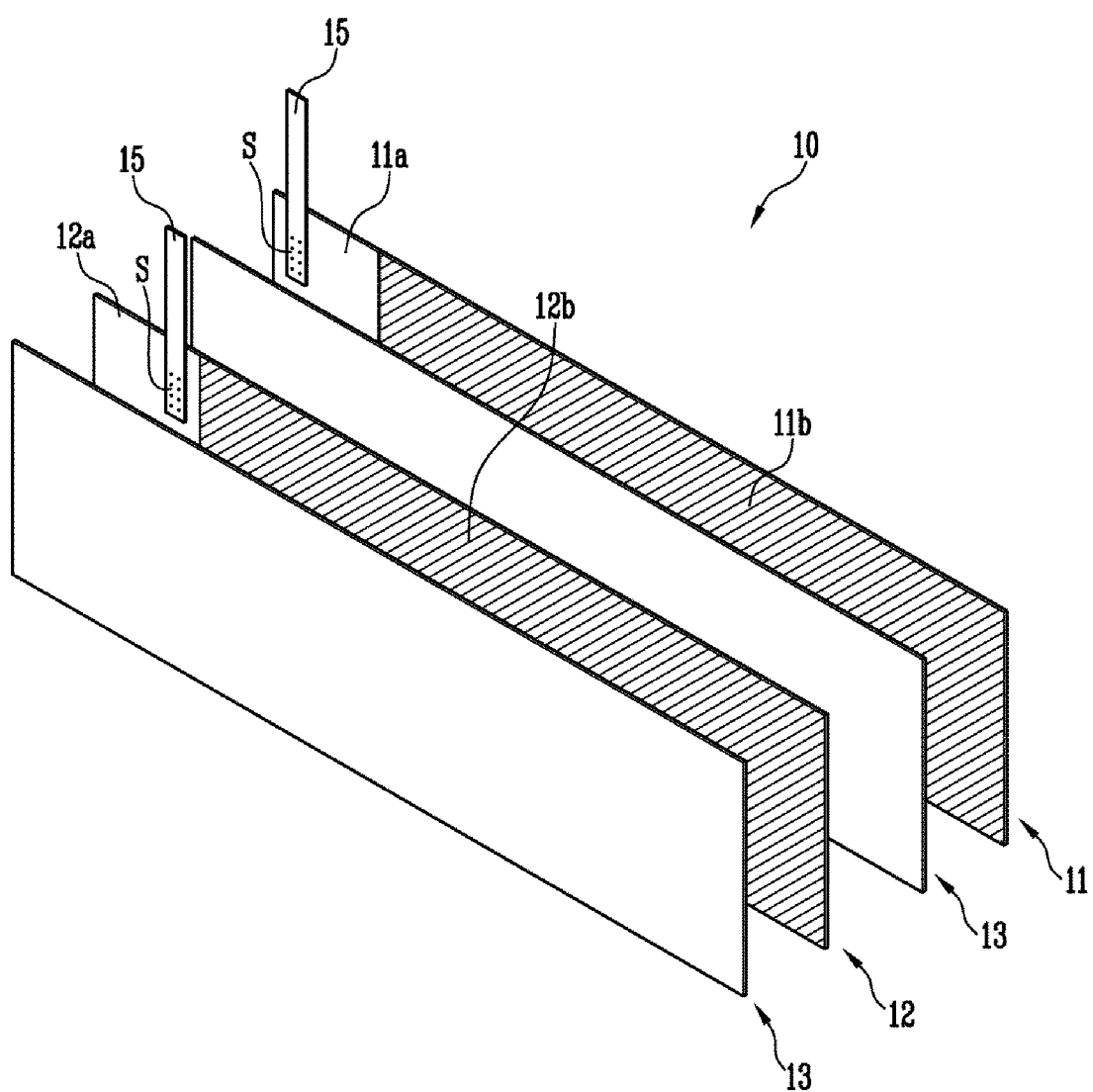
FIG. 1 is an exploded perspective view of an electrode assembly according to an embodiment.

In the following detailed description, only certain example embodiments have been shown and described, simply by way of illustration. As those skilled in the art would realize, the described embodiments may be modified in various different ways, all without departing from the spirit or scope of the present embodiments. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements. In the drawings, the thickness or size of layers are exaggerated for clarity and not necessarily drawn to scale.

Figure 2:
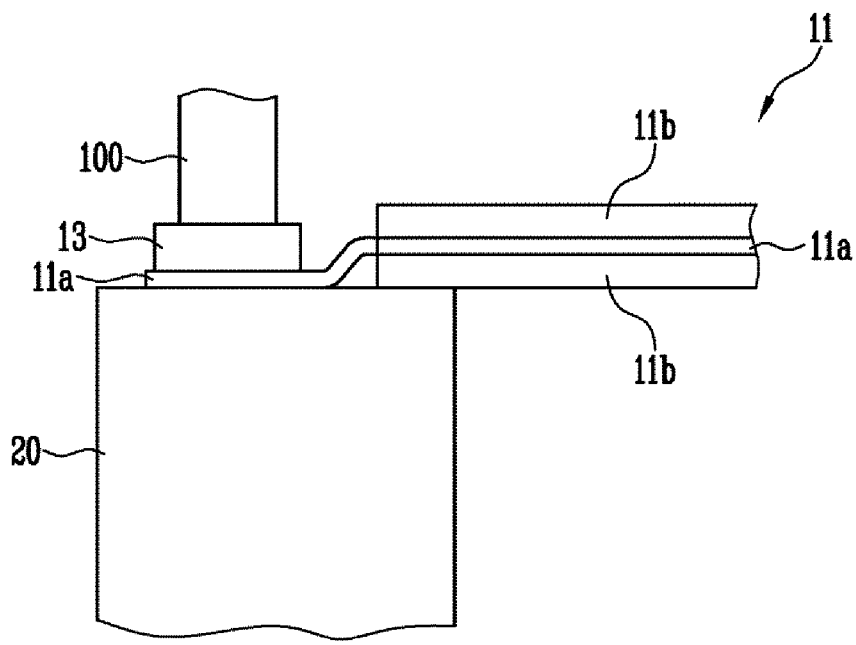
FIG. 2 is a view schematically showing a state in which welding is performed using a welding horn according to the embodiment.
Figure 3:
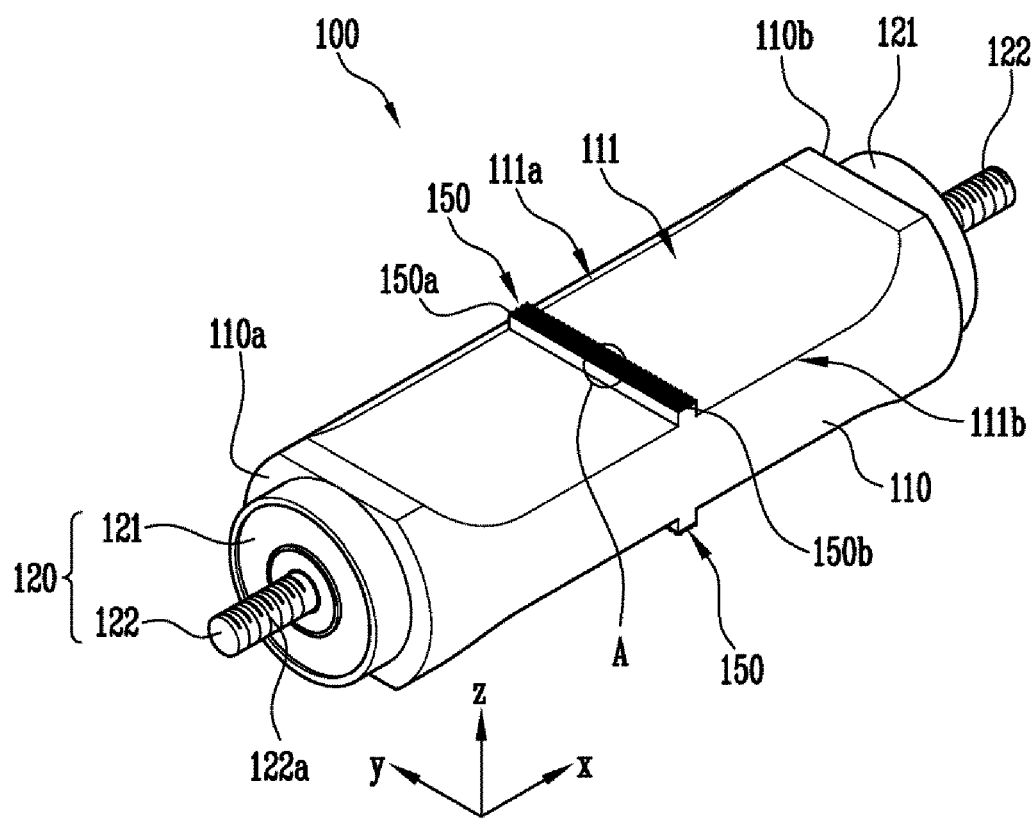
FIG. 3 is a perspective view of the welding horn according to the embodiment.
Figure 4:
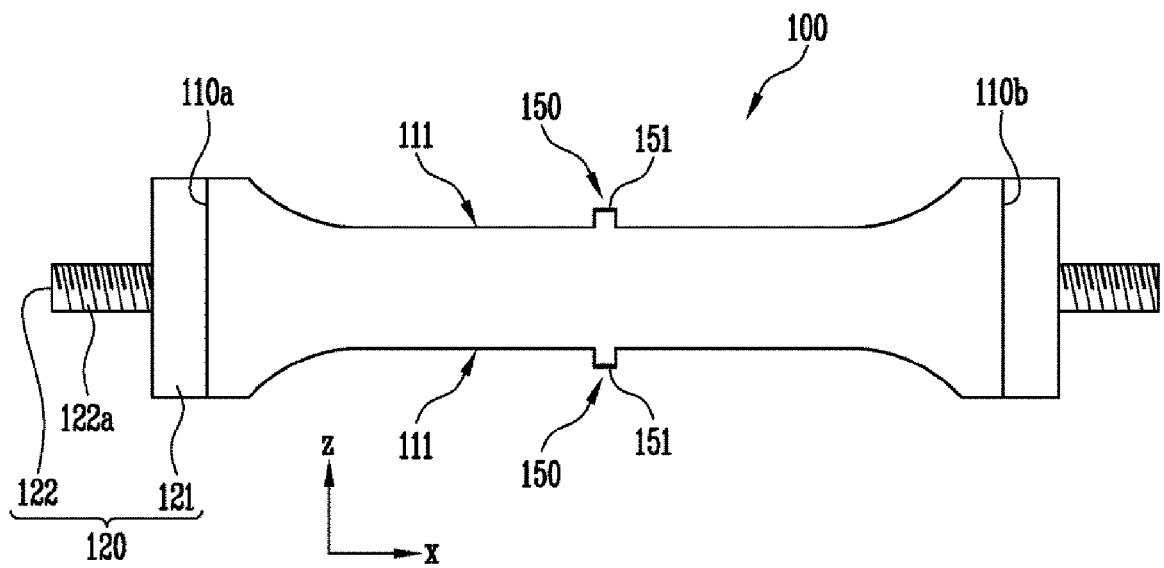
FIG. 4 is a side view of the welding horn of FIG. 3.

FIG. 1 is an exploded perspective view of an electrode assembly according to an embodiment. FIG. 2 is a view schematically showing a state in which welding is performed using a welding horn according to the embodiment. FIG. 3 is a perspective view of the welding horn according to the embodiment. FIG. 4 is a side view of the welding horn of FIG. 3.

The welding horn 100 according to this embodiment is a welding horn used in ultrasonic welding for a secondary battery. The welding horn 100 includes a body portion 110 having coupling portions 120 respectively provided at one end 110a and the other end 110b thereof, and a tip portion 150 provided at a central portion of the body portion 110 and having a protruding portion formed on a surface thereof. A nitride may be coated on at least one surface of the welding horn 100. For example, the nitride may be coated on the tip portion 150.

The welding horn 100 according to this embodiment may be used in manufacturing an electrode assembly 10 accommodated inside the secondary battery. For example, the welding horn 100 may be used in welding an electrode tab 15 to a surface of a positive or negative electrode plate 11 or 12. The secondary battery may include a battery case, and the electrode assembly and an electrolyte, accommodated inside the battery case. Electrons are generated by an electrochemical reaction between the positive and negative electrode plates 11 and 12 of the electrode assembly 10. The electrons may be moved by the electrolyte.

The positive electrode plate 11 may be formed by coating a positive electrode active material 11b including a lithium compound on a positive electrode base material 11a including, for example, aluminum, aluminum alloy or the like. In this case, the electrode tab 15 may be connected to a portion at which the positive electrode active material 11b is not provided so that the positive electrode base material 11a is exposed as it is. The negative electrode plate 12 may include a negative electrode base material 12a including, for example, copper, copper alloy or the like, and a negative electrode active material 12b including carbon coated on the negative electrode base material 12a. In the negative electrode plate 12, the electrode tab 15 may be connected to a portion at which the negative electrode active material 12b is not coated so that the negative electrode base material 12a is exposed. The positive and negative electrode plates 11 and 12 are wound or stacked with a separator 13 interposed therebetween, thereby forming the electrode assembly 10. The separator 13 has fine pores therein, so as to enable the movement of electrons or ions while preventing a short circuit caused by direct contact between the positive and negative electrode plates 11 and 12. The electrode tab 15 may be connected to each of the positive and negative electrode plates 11 and 12. In this case, the electrode tab 15 may be connected to each of the positive and negative electrode plates 11 and 12 through ultrasonic welding.

Referring to FIG. 2, the electrode tab 15 may be welded to the positive electrode plate 11 by an ultrasonic welder. In this case, the ultrasonic welder may include an anvil 20 supporting the positive electrode plate 11, and the welding horn 100 welding the electrode tab 15 to the positive electrode plate 11. For the positive electrode plate 11, the portion at which the positive electrode base material 11a is exposed may be disposed on the anvil 20, and the electrode tab 15 may be overlapped on the positive electrode base material 11a. Subsequently, the electrode tab 15 and the positive electrode base material 11a are pressed from the upside thereof using the welding horn 100, and current is applied from the ultrasonic welder to the welding horn 100, thereby welding the electrode tab 15 to the positive electrode base material 11a. In this case, the welding horn 100 generates frictional heat with the electrode tab 15 through its vibration, and accordingly, the electrode tab 15 can be welded to the positive electrode base material 11a. Although only the positive electrode plate 11 has been described herein, the process described above may be similarly applied when the electrode tab 15 is welded to the negative electrode plate 12.

Electrons (or current) generated from positive or negative electrode plates in an electrode assembly are transmitted to the outside by an electrode tab. In a case where the electrode tab is not firmly attached to the positive or negative electrode plate, the electrons (or current) may be lost by resistance. In a case where welding is performed with high intensity in order to attach the electrode tab to the positive or negative electrode plate, metal fatigue remains in the positive or negative electrode plate, and therefore, the portion at which the electrode tab is connected to the positive or negative electrode plate may be fractured by external impact or vibration.

The welding horn 100 according to this embodiment may be used for the secondary battery. The welding horn 100 may be used when the electrode tab 15 is welded to the positive or negative electrode plate 11 or 12. The welding horn 100 enables current to efficiently flow while firmly attaching the electrode tab 15 to the positive or negative electrode plate 11 or 12 without being separated from the positive or negative electrode plate 11 or 12. In a case where the ultrasonic welding is performed by the welding horn 100, no metal fatigue remains in the positive or negative electrode plate 11 or 12. Thus, the positive or negative electrode plate 11 or 12 is not easily fractured, and its impact resistance and vibration resistance can be improved.

Referring to FIGS. 3 and 4, the welding horn 100 according to this embodiment may include a body portion 110, coupling portions 12 respectively provided at one end 110a and the other end 110b of the body portion 110, and a tip portion 150 provided inside the body portion 110.

The coupling portion 120 is a portion connected to, for example, an external device such as an ultrasonic welder. The coupling portion 120 may include cylindrical support portions respectively provided at the one end 110a and the other end 110b of the body portion 110, and a fastening projection 122 protruded outward from the support portion 121 and having a screw thread 122a. The fastening projection 122 may be fastened to the external device through the screw thread 122a, and the support portion 121 may support to fix the position between the external device and the welding horn 100.

The body portion 110 has a flat surface 111 extended in a first direction (x-direction), and the first direction (x-direction) may be a direction extended from the one end 110a to the other end 110b of the body portion 110. The flat surface 111 is a surface facing the electrode tab 15 in the body portion 110, and may be provided as a flat surface parallel with the electrode tab 15. The flat surface 111 may be provided in a pair opposite to each other, and upper and lower end portions 111a and 111b of each of the pair of flat surfaces 111 are connected to be rounded. Alternatively, the upper and lower end portions 111a and 111b of each of the pair of flat surfaces 111 may be connected to be convex. The flat surface 111 may be provided to have a low step difference with respect to the one end 110a and the other end 110b of the body portion 110. The flat surface 111 is rounded inwardly concave so as to be connected to the one end 110a and the other end 110b of the body portion 110.

The tip portion 150 is a portion that comes in direct contact with the electrode tab 15, and may vibrate while pressing the electrode tab 15 and the positive or negative electrode plate 11 or 12. The electrode tab 15 may be welded to the positive or negative electrode plate 11 or 12 by the frictional heat generated by the vibration of the tip portion 150. The tip portion 150 may be protruded on the flat surface 111. For example, the tip portion 150 may be protruded on the flat surface 111 so as to have a height lower than that of the one end 110a and the other end 110b of the body portion 110. Therefore, in a case where the welding horn 100 is mounted on the ground, the one end 110a and the other end 110b of the body portion 110 may be provided to contact the ground. The tip portion 150 may be provided to be spaced apart from the ground. Thus, since the tip portion 150 is supported by the one end 110a and the other end 110b of the body portion 110, the tip portion 150 does not come in direct contact with the ground, so that it is possible to prevent the tip portion 150 from being worn away by external friction.

The tip portion 150 may be extended in a second direction (y-direction) perpendicular to the first direction (x-direction) so as to traverse the flat surface 111. For example, the tip portion 150 is extended in a rod shape to connect the upper end portion 111a to the lower end portion 111b of the flat surface 111. Therefore, the tip portion 150 may be protruded in a third direction (z-direction) from the flat surface 111. The third direction (z-direction) may be a direction that faces upwardly or downwardly to be perpendicular to the first and second directions on plane coordinates configured with the first and second directions (x-y directions). For example, the tip portion 150 may be provided to entirely extend from the upper end portion 111a to the lower end portion 111b of the flat surface 111. The left and right portions of the flat surface 111 may be individually divided by the tip portion 150.

In the welding horn 100 according to this embodiment, the flat surface 111 may be provided so that the pair of flat surfaces 111 are opposite to each other. In this case, the tip portions are provided to both the pair of flat surfaces 111, and may be provided at positions corresponding to each other. Thus, in a case where one tip portion 150 is worn away, the other tip portion 150b is used, so that it is possible to extend the replacement period of the welding horn 100, thereby improving productivity. Protruding portions 151 may be provided on the outer surface of the tip portion 150.

Figure 5:
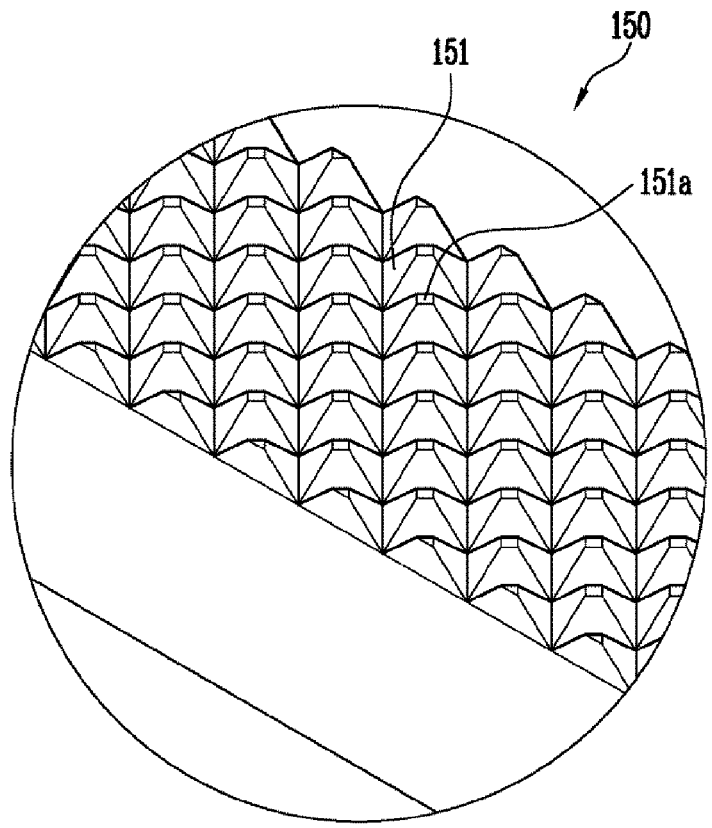
FIG. 5 is an enlarged view of portion A of FIG. 3.

FIG. 5 is an enlarged view of portion A of FIG. 3.

Referring to FIG. 5, the protruding portion 151 is provided to protrude from a first surface of the tip portion 150 in the third direction (z-direction), and the first surface may be a surface parallel with the flat surface 111. The protruding portion 151 may be protruded in a rod shape from the flat surface 111, and the first surface may be a surface parallel with the flat surface 111. The protruding portion 151 may be provided to entirely cover the first surface of the tip portion 150. For example, the protruding portion 151 may be protruded in the shape of a triangular pyramid of which base side mounted on the first surface is quadrangular.

When the protruding portions 151 are provided on the first surface that is a portion coming in direct contact with the electrode tab, the protruding portions 151 are provided to entirely cover the first surface, and thus it is possible to increase the contact area between the tip portion 150 and the electrode tab. The protruding portion 151 is provided so that a vertex 151a of the triangular pyramid is protruded outward. Thus, the protruding portion 151 can fix the electrode tab. Further, the protruding portion 151 is provided in the shape of four triangles about the vertex 151a of the triangular pyramid, so that it is possible to increase the frictional force of the protruding portion 151 with the electrode tab, thereby improving welding efficiency. In the welding horn according to this embodiment, a nitride may be coated on the tip portion 150.

Figure 6:
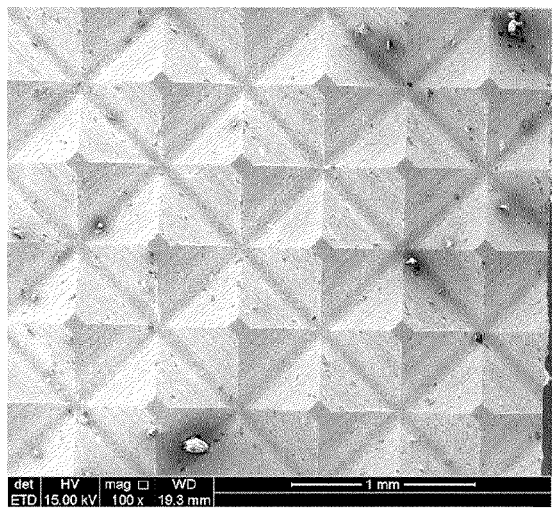
FIG. 6 is a photograph showing states before and after a nitride is coated.
Figure 6:
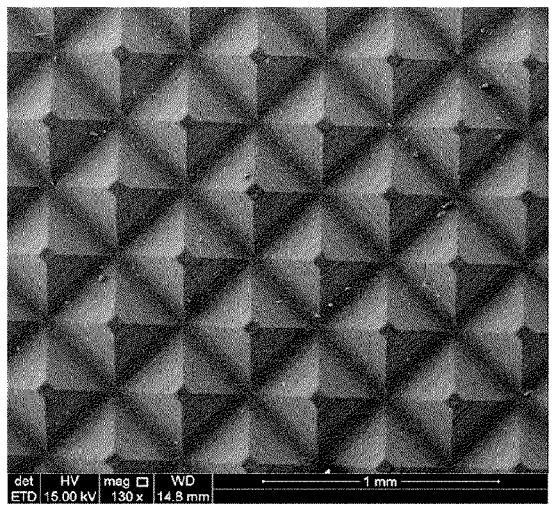
Figure 7:
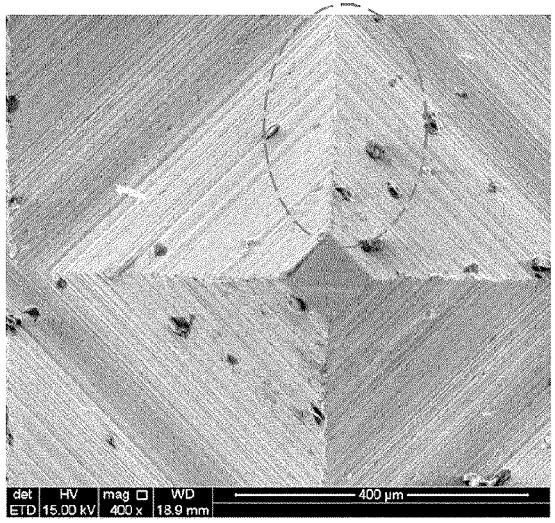
FIG. 7 is an enlarged photograph of FIG. 6.
Figure 7:
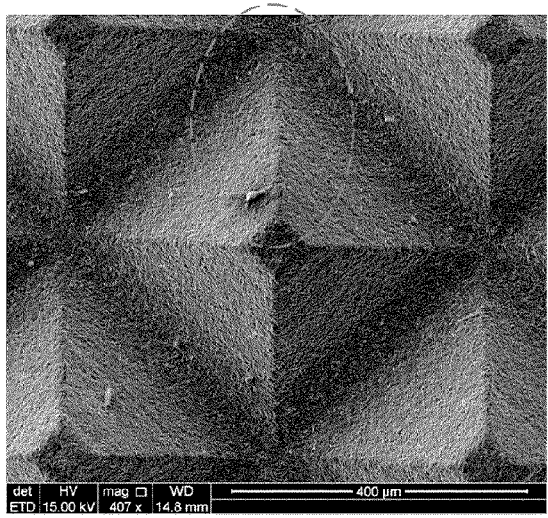

FIG. 6 is a photograph showing states before and after a nitride is coated. FIG. 7 is an enlarged photograph of FIG. 6.

Referring to FIGS. 6 and 7, there are shown photographs before and after the nitride is coated on the tip portion of the welding horn. In these figures, it can be seen that in a case where the nitride is coated on the tip portion, the roughness of the protruding portions is improved. The protruding portions may be provided to increase the contact area between the tip portion and the electrode tab. Since the welding horn comprises metal, delicate machining is performed to machine the welding horn in the shape of a protruding portion, and roughness easily exists on the surface of the protruding portion even after the protruding portion is provided. As such, the roughness may decrease the lifespan of the welding horn and interrupt the contact between the electrode tab and the base material. The nitride is coated on the protruding portion of the welding horn according to this embodiment, the protruding portion can be provided to have a smooth surface by improving the roughness of the surface thereof. Thus, when the electrode tab is welded to the positive or negative electrode plate, the welding can be uniformly performed, so that electrons (or current) can efficiently flow.

For example, the nitride may include TiN, and may be coated to have a thickness of from about 2 to about 3 μm. The method of coating the nitride on the welding horn may be performed using a hot coating technique at a temperature of about 480° C. For example, the method may be performed using a physical vacuum deposition (PVD) technique. The method may be performed by attaching gas including TiN to the inner wall of a chamber having the welding horn therein, evaporating and ionizing the TiN through an increase in the temperature of the chamber and then applying voltage to the chamber. In a case where the coating thickness of the nitride is less than 2 μm, the roughness of the protruding portion cannot be sufficiently improved, and therefore, it is difficult to uniformly weld the electrode tab to the positive or negative electrode plate. In a case where the coating thickness of the nitride exceeds 3 μm, the coating time of the nitride is increased even though the roughness of the surface of the protruding portion is sufficiently improved, and therefore, the manufacturing cost of the welding horn may be unnecessarily increased. Accordingly, the coating thickness of the nitride is preferably from about 2 to about 3 μm.

The welding horn according to this embodiment can be used to weld the electrode tab to the positive or negative electrode plate in the secondary battery. The contact area between the welding horn and the electrode tab is increased so that it is possible to prevent the positive or negative electrode plate from being fractured by external impact or vibration and to firmly weld the electrode tab to the positive or negative electrode plate. Further, in the welding horn according to this embodiment, a nitride is coated on the protruding portion, so that it is possible to improve the roughness of the protruding portion. Accordingly, the electrode tab can be uniformly welded on the positive or negative electrode plate.

While the present embodiments have been described in connection with certain example embodiments, it is to be understood that the embodiments are not limited to the disclosed embodiments, but, on the contrary, is intended to cover various modifications and equivalent arrangements included within the spirit and scope of the appended claims, and equivalents thereof.

What is claimed is:

1. A welding horn for a secondary battery, configured for use in ultrasonic welding, the welding horn comprising:
   a body portion having coupling portions respectively provided at one and the other ends thereof; and
   two tip portions provided at a central portion of the body portion and having protruding portions provided on a surface thereof,
   wherein a nitride is coated on at least one surface of the welding horn,
   each of the protruding portions protrudes in the shape of a triangular pyramid of which the base side mounted on the surface of the tip portion is quadrangular,
   wherein the body portion has two flat surfaces extended in a first direction, and the first direction is a direction extended from the one end to the other end of the body portion;
   wherein the two flat surfaces are on opposite sides of the body portion;
   wherein the tip portions protrude from the flat surfaces, and extend in a second direction perpendicular to the first direction so as to traverse the flat surface;
   wherein the tip portions protrude from the flat surface and have rod shapes which each contact one of the flat surfaces from an upper end portion to a lower end portion of the flat surface; and
   wherein the tip portions protrude from the flat surfaces so as to have a height lower than the one end and the other end of the body portion.

2. The welding horn of claim 1, wherein the nitride is coated on the tip portion.

3. The welding horn of claim 1, wherein the nitride includes TiN.

4. The welding horn of claim 1, wherein the nitride is coated to have a thickness of about 2 to 3 μm.

5. The welding horn of claim 1, wherein the welding horn is configured for use in welding an electrode tab to a surface of a positive or negative electrode plate.

6. The welding horn of claim 1,
   wherein the flat surface is provided in a pair opposite to each other, and the tip portion is provided in a pair to both of the pair of flat surfaces, and
   wherein the tip portions are provided at positions corresponding to each other.

7. The welding horn of claim 1, wherein the protruding portion is provided to protrude from a first surface of the tip portion, and the first surface is a surface parallel with the flat surface.

8. The welding horn of claim 7, wherein the base side of the protruding portion is mounted on the first surface of the tip portion.

9. The welding horn of claim 1, wherein the coupling portion is a portion coupled to an external device, and includes cylindrical support portions respectively provided at the one and the other ends of the body portion, and a fastening projection protruded outward from the support portion and having a screw thread on a surface thereof.

10. A method of ultrasonic welding comprising:
    using a welding horn to weld two or more objects together;
       wherein the welding horn comprises:
         a body portion having coupling portions respectively provided at one and the other ends thereof; and
         two tip portions provided at a central portion of the body portion and having protruding portions provided on a surface thereof,
         wherein a nitride is coated on at least one surface of the welding horn,
         each of the protruding portions protrudes in the shape of a triangular pyramid of which the base side mounted on the surface of the tip portion is quadrangular,
         wherein the body portion has two flat surfaces extended in a first direction, and the first direction is a direction extended from the one end to the other end of the body portion;
         wherein the two flat surfaces are on opposite sides of the body portion;
         wherein the tip portions protrude from the flat surfaces, and extend in a second direction perpendicular to the first direction so as to traverse the flat surface;
         wherein the tip portions protrude from the flat surface and have rod shapes which each contact one of the flat surfaces from an upper end portion to a lower end portion of the flat surface; and
         wherein the tip portions protrude from the flat surfaces so as to have a height lower than the one end and the other end of the body portion.

11. The method of claim 10, wherein the nitride is coated on the tip portion.

12. The method of claim 10, wherein the nitride includes TiN.

13. The method of claim 10, wherein the nitride is coated to have a thickness of about 2 to 3 μm.

14. The method of claim 10, wherein the two objects to be welded comprise an electrode tab and a surface of a positive or negative electrode plate.

* * * * *